United States Patent
Schultz et al.

(10) Patent No.: US 9,196,309 B2
(45) Date of Patent: Nov. 24, 2015

(54) SOURCE CONTENT PREVIEW IN A MEDIA SYSTEM

(75) Inventors: Steven Gene Schultz, Holland, MI (US); Douglas C. Campbell, Northville, MI (US); Eric Sean Deuel, Allendale, MI (US); Stephen Todd Sanders, Zeeland, MI (US)

(73) Assignee: JOHNSON CONTROLS, INC., Milwaukee, WI (US)

( * ) Notice: Subject to any disclaimer, the term of this patent is extended or adjusted under 35 U.S.C. 154(b) by 1379 days.

(21) Appl. No.: 12/519,070

(22) PCT Filed: Dec. 12, 2007

(86) PCT No.: PCT/US2007/087277
§ 371 (c)(1),
(2), (4) Date: Dec. 18, 2009

(87) PCT Pub. No.: WO2008/076765
PCT Pub. Date: Jun. 26, 2008

(65) Prior Publication Data
US 2010/0235744 A1    Sep. 16, 2010

Related U.S. Application Data

(60) Provisional application No. 60/874,489, filed on Dec. 13, 2006.

(51) Int. Cl.
*H04N 5/445* (2011.01)
*G11B 27/10* (2006.01)
(Continued)

(52) U.S. Cl.
CPC .......... *G11B 27/105* (2013.01); *G06F 17/3002* (2013.01); *G06F 17/30058* (2013.01); *H04N 21/482* (2013.01)

(58) Field of Classification Search
USPC .............................................. 725/43, 74–77
See application file for complete search history.

(56) References Cited

U.S. PATENT DOCUMENTS 6,219,839 B1 * 4/2001 Sampsell ........................ 725/40
2001/0030667 A1    10/2001 Kelts
(Continued)

FOREIGN PATENT DOCUMENTS

JP    08-307792    11/1996
JP    11-088419    3/1999
(Continued)

OTHER PUBLICATIONS

Translation of Office Action for Japanese Patent Application No. 2009-541563 mailed Feb. 17, 2012, 3 pgs.
(Continued)

*Primary Examiner* — Nicholas Corbo
(74) *Attorney, Agent, or Firm* — Amin, Turocy & Watson, LLP

(57) ABSTRACT

Systems and/or methods are provided that facilitate surveying media sources in a media entertainment system. An index component can provide an index of a set of available media sources in the media entertainment system. In addition, a selection component can displays the set of available media sources and receive selection requests for a subset of the available media sources. Further, a preview component can display a sample of media generated by the selected subset of media sources prior to active engagement thereof. Moreover, one or more aspects can be implemented in a vehicle entertainment system.

25 Claims, 10 Drawing Sheets

(51) Int. Cl.
*H04N 21/482* (2011.01)
*G06F 17/30* (2006.01)

(56) References Cited

U.S. PATENT DOCUMENTS

| | | | |
|---|---|---|---|
| 2002/0073424 A1* | 6/2002 | Ward et al. | 725/42 |
| 2003/0093798 A1* | 5/2003 | Rogerson | 725/75 |
| 2004/0177063 A1 | 9/2004 | Weber et al. | |
| 2004/0254956 A1 | 12/2004 | Volk | |
| 2005/0228806 A1 | 10/2005 | Haberman | |
| 2006/0064716 A1 | 3/2006 | Sull | |
| 2006/0107289 A1 | 5/2006 | Deyonker et al. | |
| 2007/0143493 A1* | 6/2007 | Mullig et al. | 709/232 |
| 2008/0066091 A1* | 3/2008 | Stefanik et al. | 725/8 |
| 2008/0066126 A1* | 3/2008 | Walter et al. | 725/97 |
| 2008/0077956 A1* | 3/2008 | Morrison et al. | 725/38 |

FOREIGN PATENT DOCUMENTS

| | | |
|---|---|---|
| JP | 11-261908 | 9/1999 |
| JP | 2003-163899 | 6/2003 |
| JP | 2005-098831 | 4/2005 |
| JP | 2005-514876 | 5/2005 |
| JP | 2005-311676 | 11/2005 |
| JP | 2006-094442 | 4/2006 |
| JP | 2006-211311 | 8/2006 |
| JP | 2006-333368 | 12/2006 |
| WO | 03/058954 A2 | 7/2003 |
| WO | 2005-027512 | 3/2005 |
| WO | 2005027068 A1 | 3/2005 |
| WO | 2008076765 A2 | 6/2008 |

OTHER PUBLICATIONS

EP Search Report for EP Application No. 07865583.4-2223/2095260 dated Mar. 17, 2010, 10 pages.
International Search Report and Written Opinion of International Application No. PCT/US07/87277 dated Jul. 28, 2008, 12 pages.
Translation of Office Action for Japanese Patent Application No. 2009-541563 mailed Aug. 10, 2012, 3 pages.
Office Action dated Sep. 18, 2012 for European Patent Application No. 07 865 583.4-2223/2095260, 6 pages.
OA for JP Application No. 2009-541563, dated Sep. 22, 2011, 5 pages.
Japanese Office Action mailed Dec. 3, 2013 for Japanese Patent Application No. 2009-541563, 11 pages.
OA for EP Application No. 07865583.4-2223/2095260 dated Aug. 12, 2010, 1 page.

* cited by examiner

SOURCE CONTENT PREVIEW IN A MEDIA SYSTEM

CROSS-REFERENCE TO RELATED APPLICATIONS

This application is a US national stage filing of Patent Cooperation Treaty (PCT) application serial number PCT/US07/87277 filed Dec. 12, 2007, which claims priority to U.S. Provisional Patent Application Ser. No. 60/874,489 entitled "SYSTEM AND METHOD FOR SELECTING A SOURCE OF MEDIA CONTENT IN A PICTURE-IN-PICTURE WINDOW" which was filed Dec. 13, 2006. The entireties of the aforementioned applications are incorporated herein by reference.

BACKGROUND

Typically, multimedia entertainment systems can include a variety of media devices for consumption by users. Media devices can include media sources that read or play media content stored on various portable means, media streamed over a radio frequency signal or a satellite signal. The content can include DVD movies, CD audio, digital music on mass storage devices or flash devices, video games played on video game consoles and the like. Media devices can also include a variety of media output devices. For example, multimedia entertainment systems can have displays (e.g., televisions, plasma displays, LCD displays, CRT displays, etc.), speakers, sub-woofers, projectors, and so on.

Historically, complex multimedia entertainment systems that include a variety of devices were found only in homes or other buildings. However, advancements in automotive technology enable a vast amount of media sources to be implemented in vehicles such as cars, trucks, vans, etc. In conventional in-vehicle entertainment systems, a passenger can have multiple options for listening, watching or interacting with media content, such as music, movies and video games. For example, passenger can listen to music from a radio, satellite radio, CD player, portable digital music player, a mass storage device, a flash drive, a USB drive and the like. In addition, the passenger can watch movies or videos from a DVD player, a VCR, a mass storage device, a portable media player, a computer and so on. In some vehicle entertainment systems, such as rear seat entertainment systems, a plurality of output devices can individually present media content from distinct sources. Moreover, multiple media sources can be playing simultaneously. Typically, the passenger utilizes a button, switch, knob, etc to switch media sources via a selection.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Conventionally, media control systems enable a user to switch between a variety of disparate media sources such as, for example, DVD players, CD players, portable music players, and the like. The user can engage a particular source through a selection mechanism (e.g., a user interface, remote control device, etc.) to access desired content of the source. However, the user is typically prevented from browsing media sources or inspecting the content of a media source without fully activating or engaging the media source (e.g., initiating full playback).

The subject disclosure provides a preview of content related to a media source prior to actively engagingly the source. In one aspect, the preview is disclosed in a picture-in-picture window presented concurrently with an active source, if any. The picture-in-picture window can be shown on an output display (e.g., a vehicle display). The picture-in-picture window enables a user to perceive information about a media source selected for preview. For example, if the selected media source is a DVD player, the picture-in-picture can present a video of a related DVD.

Concurrently, a currently playing information window can be provided to display information of content actively engaged. In an illustrative instance, while the DVD preview is displayed, information regarding the currently active source can also be displayed. In another aspect, a media source list is provided that indicates media sources from which a user can receive media content. Further, according to one embodiment, the preview presented in the picture-in-picture window can be generated from a variety of sources. For example, a preview can be constructed from content retrieved from the media source as well as from a remote source.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
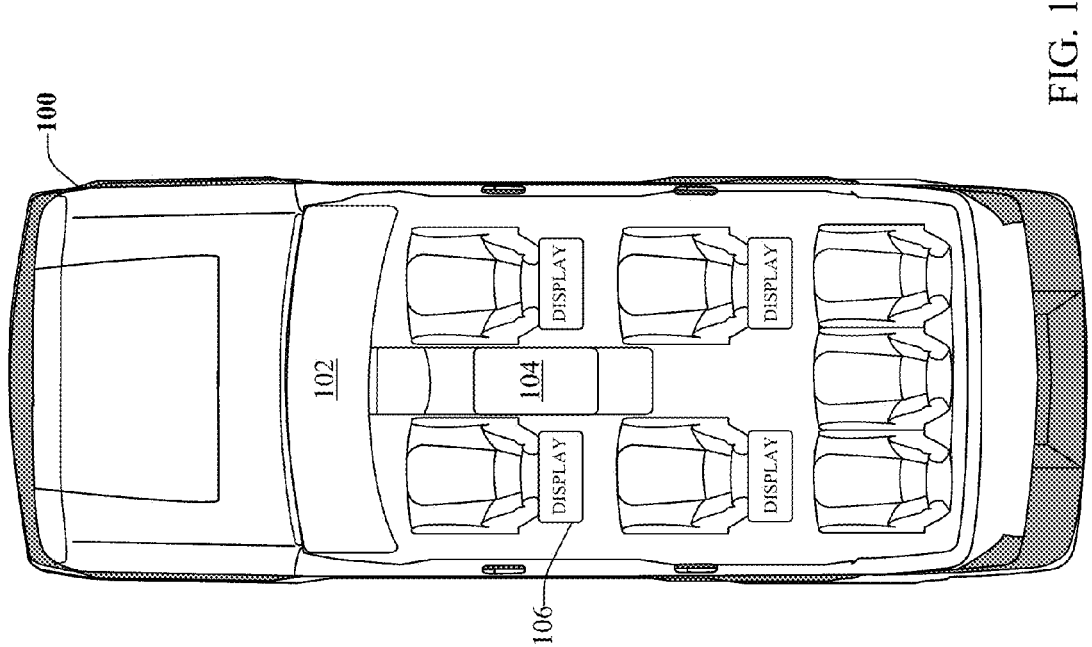
FIG. 1 illustrates an example environment in accordance with one or more aspects of the subject disclosure.
Figure 1:
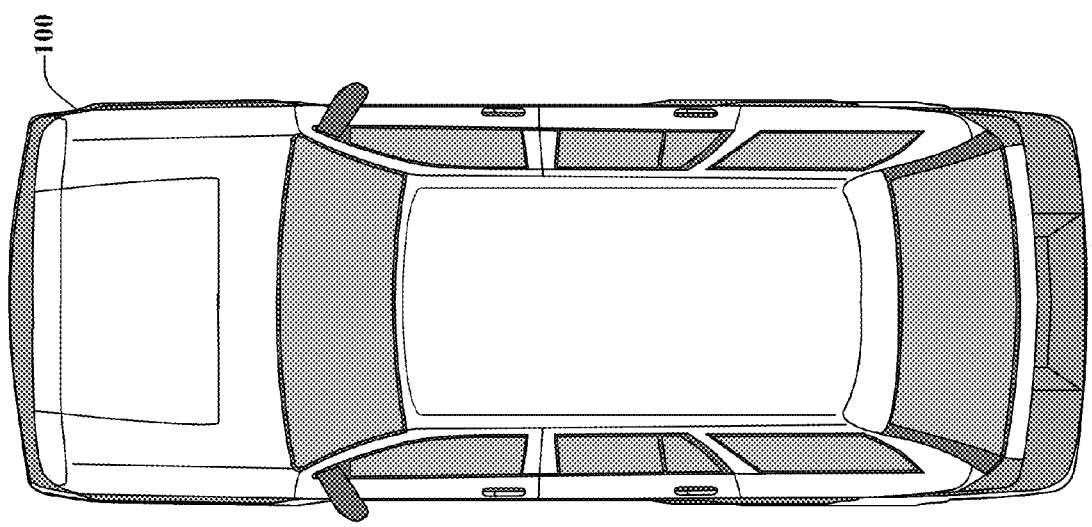

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

A plurality of media sources can be surveyed through a preview of content related to a selected media source prior to actively engagingly the source. The preview is disclosed in a picture-in-picture window or isolated panel presented concurrently with an actively engaged source, if any. The preview can be shown on an output display (e.g., a vehicle display). According to an example, if the selected media source is a DVD player, the preview can be a video of a DVD. Further, if a music source is actively engaged, the music can continue to play while information is corresponding to the music can display alongside the DVD preview.

Turning now to the figures, FIG. 1 depicts an example environment in accordance with one or more aspects of the subject disclosure. FIG. 1 illustrates a vehicle 100 that can be an automobile. While vehicle 100 depicts a sport utility vehicle, it is to be appreciated that other automobiles can be utilized. For example, aspects of the subject disclosure can be utilized in sedans, mini-vans, coupes and the like. In addition, transportation means other than automobiles can be employed as an environment. Pursuant to an illustration, airplanes, trains, watercraft and any other vehicle capable of supporting an entertainment system can employ various aspects of the subject disclosure. Moreover, it is to be appreciated that other environments besides transportation vehicles can be utilized. By way of example, office buildings, houses, apartments and other locations with media systems that include a plurality of media sources can benefit from source content previews.

Also illustrated in FIG. 1 is an example interior view of vehicle 100. Vehicle 100 includes a dashboard console 102 that can comprise various control apparatus of vehicle 100. In an illustrative instance, the dashboard console 102 can include a steering wheel, a heads up display that includes a speedometer, odometer, tachometer, etc., exterior vehicle light controls, vehicle turn signal controls, temperature controls, wiper controls, etc. In addition, the dashboard console 102 can include audio systems such as a radio, a CD/DVD player or other audio device. The dashboard console 102 can also include a display that outputs media information (e.g., audio source metadata) and/or GPS navigation information (e.g., maps, points of interests, etc.). It is to be appreciated that the display and/or other portion of the dashboard console 102 can be a touch screen capable of obtaining input from an operator to control various vehicle mechanisms. The dashboard console 102 can further include media processing systems that obtain, access, process and present media content from a plurality of sources.

Vehicle 100 can also include a center console 104 that can include features typical of a vehicle environment such as, but not limited to, a storage compartment, beverage holders, automatic or manual transmission shifting mechanisms, and the like. The center console 104, similar to the dashboard console 102, can include media processing systems. In addition, the center console 104 can include access points for a plurality of media sources. For example, the center console 104 can house DVD players, video game systems, CD players, portable music player interfaces, etc. Moreover, the center console 104 can include one or more displays visible to a front seat passenger or rear seat passengers.

In an embodiment, vehicle 100 can include a rear seat entertainment system. FIG. 1 illustrates seat back displays 106 that present media content to rear seat passengers of vehicle 100. It is to be appreciated that displays 106 need not be in the seat backs or head rests. For example, displays 106 can be located on the ceiling of vehicle 106. Moreover, displays 106 can fold or flip down from a stored position in the ceiling. In accordance with an aspect, displays 106 can individually contain media sources. Pursuant to an illustration, displays 106 can be operatively coupled to CD players, DVD players, video game players, external source interfaces, etc. For example, a DVD player can be housed behind a seat back display. The displays 106 can individually present media content independently. One display can present a DVD movie, another display can present a video game, and a third display can disclose metadata on currently playing music.

Figure 2:
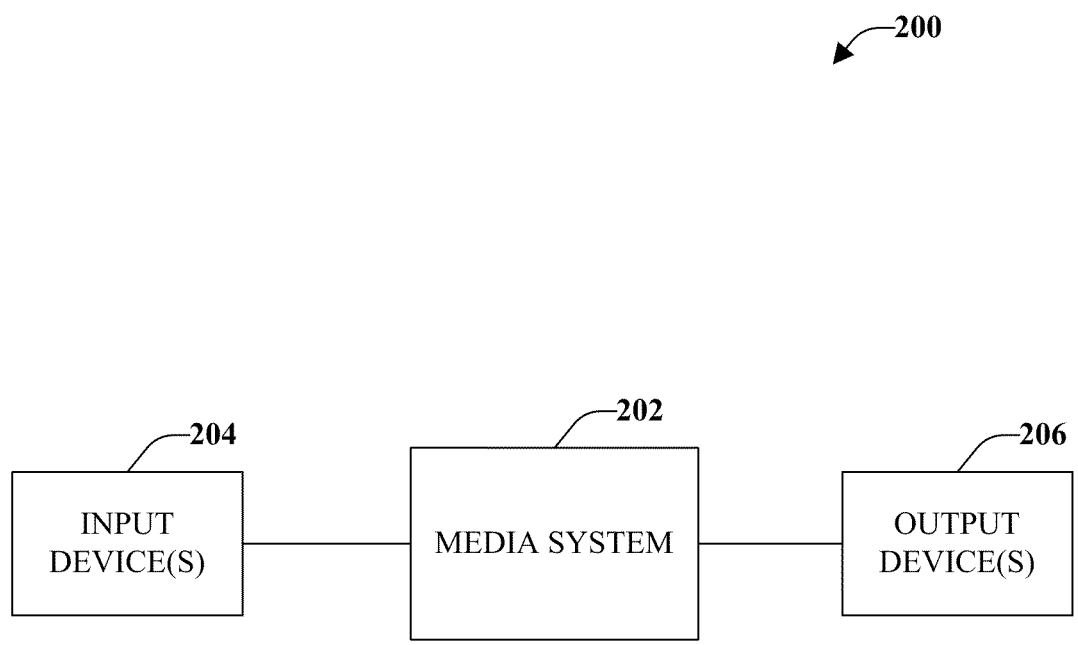
FIG. 2 illustrates an example entertainment system suitable for implementing aspects of the subject disclosure.

FIG. 2 illustrates an example entertainment system 200 in accordance with an aspect of the subject disclosure. System 200 can be implemented in a vehicle, other transportation machinery, or a building (e.g., office, house, apartment . . . ). For example, system 200 can be integrated into a dashboard of a vehicle, a center console of a vehicle or any other suitable location (e.g., trunk compartment, engine compartment, etc.). The system 200 includes media system 202 that processes, obtains, accesses, distributes and presents media content from a plurality of media sources. Media content can be audio, video, video games, text and the like embodied on CDs, DVDs, USB drives (e.g. pen drives), cell phones, PDAs, a laptop computer, portable music players, hard drives or other such storage medium.

The system 200 further includes input devices 204 that collects input from a user and/or provides media content to media system 202. In accordance with an aspect, input devices 204 are communicatively coupled to media system 202 via a wired and/or wireless link. Input devices 204 can include media sources such as CD players, DVD players, video game consoles, portable media players, etc. In addition, input devices 204 can include remote media sources accessed via a communications link such as Wi-Fi, satellite communications, cellular technologies (e.g., GSM, CDMA, 3G, UMTS . . . ) or the like. Input devices 204 can include devices that obtain user input. For example, input devices 204 can include touch screens, microphones, buttons, remote control devices and other mechanisms operable to receive user input related to media system 202.

The media system 202 is communicatively coupled to output devices 206. Similar to input device 204, output devices 206 can communicate with media system 202 via a wired and/or wireless link. Output devices 206 can include one or more displays (e.g. dashboard screens, seat back displays, overhead displays, etc. in a vehicle implementation) configured to present user interfaces, video, media metadata, text, etc. The one or more displays can be an LCD panel, a CRT or other display screen. It is to be appreciated that the one or more displays can also be touch screens included in input devices 204. Moreover, the output devices 206 can include one or more speakers capable of presenting audio output. In addition to the one or more speakers, other audio components can be provided. For example, the output devices 206 can employ sub-woofers, pre-amplifiers or a power amplifier in presenting audio content to users.

In an embodiment, the media system 202 can obtain user input via a user interface provided by input devices 204. The user interface can include a touch panel, buttons, knobs, switches, remote controls or other such mechanisms that permit users to interact with media system 202. The user input can be a selection of a media source, an output mode, or a configuration of output parameters (e.g. volume). Pursuant to an example illustration where a user selects a media source for presentment, the media system 202 can obtain the selection from input devices 204. The media system 202 can access an appropriate media source from among input devices 204 (e.g. a CD player) to retrieve media content. The media system 202 can perform any necessary processing (e.g. compression, formatting or the like) on the media content before presentment. The media system 202 can forward the processed media content to an appropriate component among output devices 206. For example, in the case of music from a CD, the media system 202 forwards the media content to one or more speakers and can forward metadata or identification information to a display. It is to be appreciated that media system 202 can forward media content to an output device selected by a user or an output device associated with the input device that obtained the user input. For example, a user can select audio media content to be presented via an audio out port (e.g. headphone jack) or the media system 202 can output media content on a display mechanism employed to select the media source.

Figure 3:
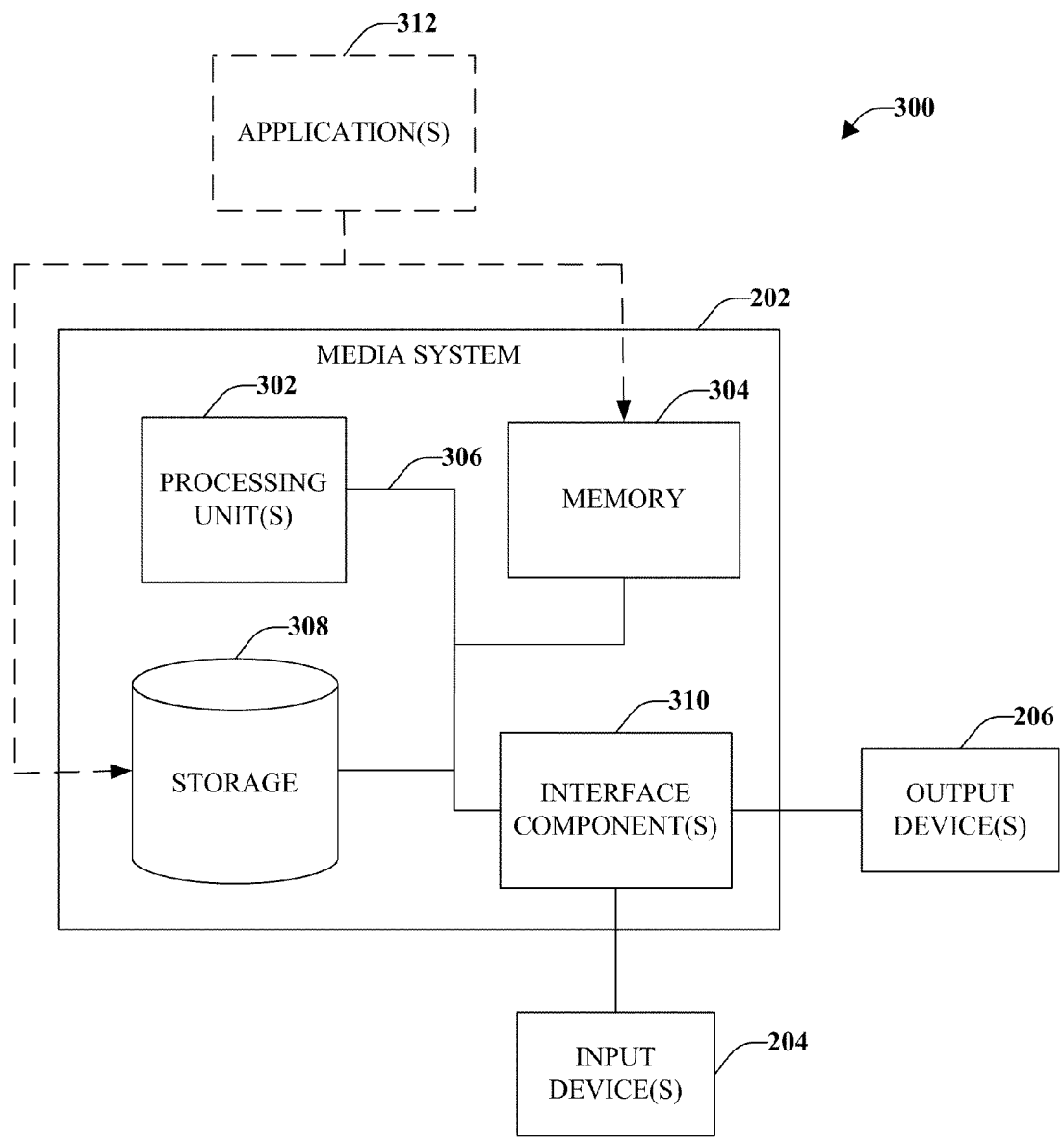
FIG. 3 illustrates an exemplary environment for implementing various aspects of the disclosure.

Referring to FIG. 3, an exemplary environment 300 for implementing various aspects disclosed herein includes a media system 202 (e.g., an entertainment system in a vehicle, airplane, building or the like). The media system 202 includes a processing unit 302, a memory 304 and a system bus 306. The system bus 306 couples system components including, but not limited to, the memory 304 to the processing unit 302. The processing unit 302 can be any of various available microprocessors. It is to be appreciated that dual microprocessors, multi-core and other multiprocessor architectures can be employed as the processing unit 302.

The memory 302 can include volatile and/or nonvolatile memory. A basic input/output system (BIOS), containing the basic routines to transfer information between elements within the media system 302, such as during start-up, is stored in nonvolatile memory. By way of illustration, and not limitation, nonvolatile memory can include read only memory (ROM). Volatile memory includes random access memory (RAM), which can act as external cache memory to facilitate processing.

Media system 202 also includes removable/non-removable, volatile/non-volatile computer storage media. FIG. 3 illustrates, for example, storage 308. Storage 308 includes, but is not limited to, devices like a magnetic or optical disk drive, floppy disk drive, flash memory or memory stick. In addition, storage 308 can include storage media separately or in combination with other storage media.

FIG. 3 provides software application(s) 312 that act as an intermediary between users and/or other computing devices and the basic resources described in suitable operating environment 300. Such software application(s) 312 include one or both of system and application software. System software can include an operating system, which can be stored on storage 308, that acts to control and allocate resources of the media system 202. Application software takes advantage of the management of resources by system software through program modules and data stored on either or both of memory 304 and storage 308.

The media system 202 also includes one or more interface components 310 that are communicatively coupled to the bus 306 and facilitate interaction with the media system 202. By way of example, the interface component 310 can be a port (e.g., serial, parallel, PCMCIA, USB, FireWire . . . ) or an interface card (e.g., sound, video, network . . . ) or the like. The interface component 310 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computers or media systems and the like. Input devices 204 can further include media sources such as CD players, DVD players, video game consoles, portable media players, satellite, radio, touch screens, buttons, knobs, switches, etc. Output can also be supplied by the media system 202 to output device(s) via interface component 310. Output devices can include displays (e.g., CRT, LCD, plasma . . . ), speakers, remote devices and other computing devices, among other things.

Figure 4:
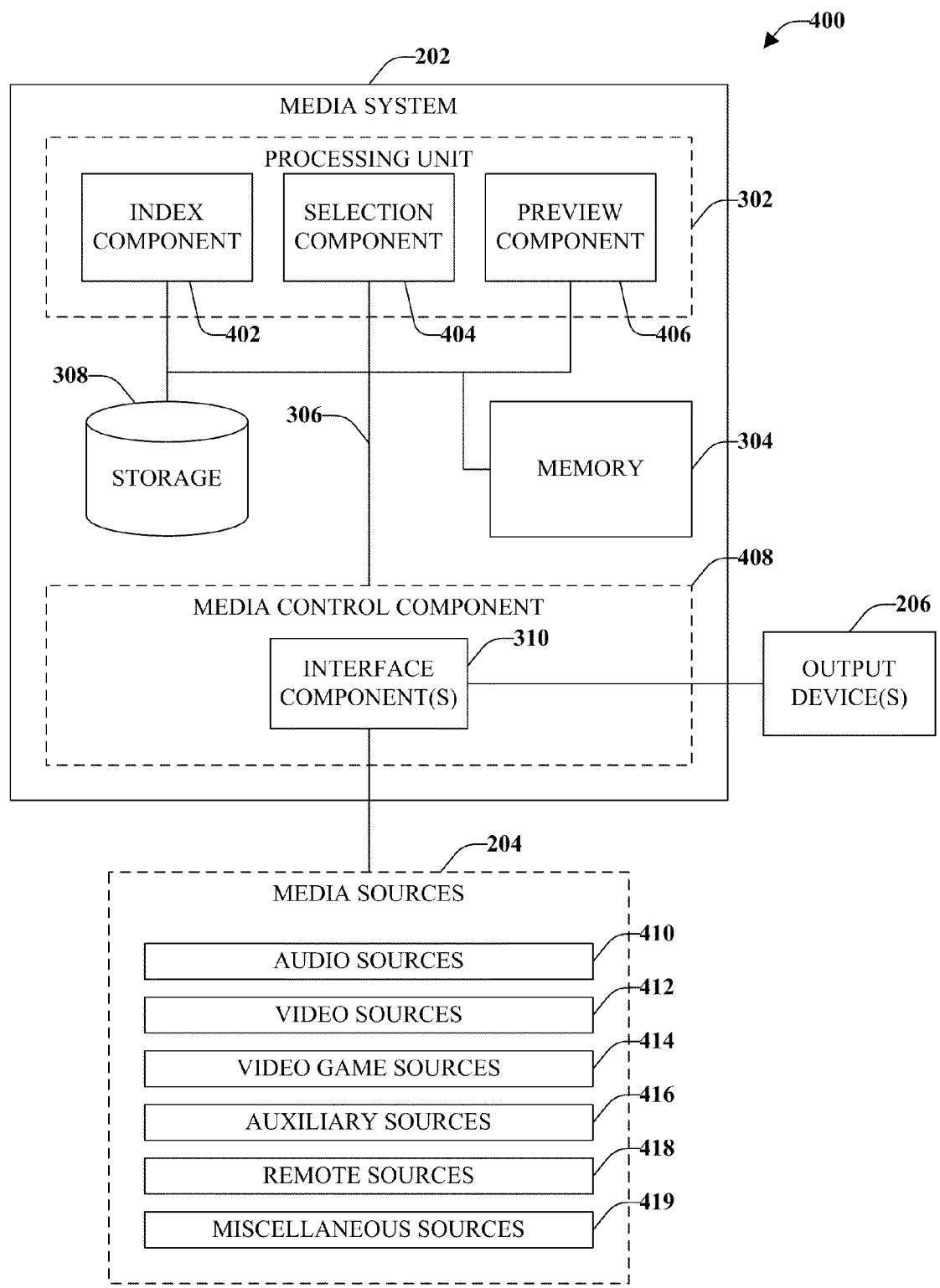
FIG. 4 illustrates an example system that facilitates surveying a set of available media source according to an aspect of the subject disclosure.

FIG. 4 illustrates an example system 400 that facilitates surveying a set of available media sources. The system 400 includes media system 202 that processes, obtains, accesses, distributes and presents media content from a plurality of media sources. The media system 202 includes a processing unit 302, a memory 304 and a system bus 306. The system bus 306 couples system components including, but not limited to, the memory 304 to the processing unit 302. The media system 202 further includes a media control component 408 that employs interface component 310 to facilitate accessing, extracting or presenting media content. The media control component 408 is communicatively coupled (wired or wirelessly) to media sources 204 and output device 206. The media control component 408 can be coupled to bus 306 to provide media content from media sources 204, provide metadata related to the media content, or retrieve media streams from processing unit 302, memory 304 and/or storage 308 of media system 202.

Media sources can include audio sources 410, video sources 412, video game sources 414, auxiliary sources 416, remote sources 418 and miscellaneous sources 420. Audio sources 410 can be, for example, a CD player, a hard drive that stores digital music (e.g., MP3, MP4, WAV, OGG etc.), a cassette tape player, an eight track player, terrestrial radio (e.g. AM/FM), high definition radio, digital radio, satellite radio, a flash memory reader, and the like. In an illustrative instance, video sources 412 can include one or more of a DVD player or any other optical disc reader, a high definition digital video player, satellite dish, television, a flash memory player, among others. Video game sources 414 can include video game consoles or other video game platforms capable of executing video game content. In one embodiment, auxiliary sources 416 can be portable devices such as, but not limited to, portable music players (e.g., MP3 players), cell phones, USB drives, personal digital assistants (PDAs), laptop computer, mobile computers, handheld video game consoles, or any other portable device that can be communicatively coupled (wired or wirelessly) to media system 202 via interface component 310 and/or media control component 408. In addition, media sources 204 can comprise remote sources 418 such as remote servers (e.g., web sites or remote databases). Remote sources 418 can also include communication links to media content retained or playable in a house, another vehicle, etc. It is to be appreciated that auxiliary sources 416 and remote source 418 can include media content similar to that provided by audio sources 410 and video source 412. Moreover, miscellaneous sources 420 can provide visual or textual media such as digital photographs, electronic books, or other pictorial or textual data.

In accordance with an aspect, processing unit 302 can include an index component 402, a selection component 404, and a preview component 406. While FIG. 4 depicts the index component 402, the selection component 404 and the preview component 406 to be associated with processing unit 302, it is to be appreciated that this need not be the case. For example, each component can be an individual processing unit. In addition, each component can be a portion of software retained by storage 308 and/or memory 304 to be executed by processing unit 302.

The index component 402 provides an index that includes a set of available media sources among media sources 204. In an embodiment, the index component 402 can provide a fixed index of media sources associated with media system 202. The index can be retained by storage 308 and/or memory 304. In addition, the index component 402 can employ media control component 408 to scan, iterate or detect media sources 204 dynamically. For example, a user can couple a portable music player to a auxiliary audio port or to media system 202 via a wireless connection. The index component 402 can detect the addition of the portable music player and make appropriate changes to the index. Moreover, an index specifying a plurality of media sources can be pre-supplied and retained by storage 308 and/or memory 304. The index component 402 can generate an index on first-run or dynamically re-generate indices from time to time.

The index component 402 can provide the index specifying the set of available media sources to the selection component 404. The selection component 404 can display the set of available media sources and can receive selection requests for a subset of the available media sources. The selection component 404 can provide a user interface (e.g., a graphical user interface) that conveys information about media system 202 to a user. In an illustrative instance, the user interface can display the set of available media sources as a sidebar list, a menu bar or any other form capable of presenting a list of media sources. The user interface can be displayed employing output devices 206. The selection component 404 can obtain a selection from a user of a subset of the available media sources. The selection can be obtained via a touch screen, buttons, switches, knobs or any other means capable of retrieving a choice by a user.

The selection component 404 provides the selected subset to the preview component 406. The preview component 406 can display one or more samples of media generated by the selected subset of media sources prior to active engagement of the sources. The samples can be a display of media content streaming from a media source. For example, in a multi-source, multi-user environment (e.g., rear seat entertainment system in a vehicle), a plurality of users can individually consume media content from a plurality of sources. Thus, the samples can be media streams corresponding to a media source actively engaged by another user. In addition, the samples can be a preview extracted from the media source (e.g., a movie trailer, selected scene, a portion of a music track, etc.). Moreover, the samples can be a portion of media content associated with the media source obtained from a remote location. It to be appreciated that the sample can include a combination of remote content, extracted previews or streams media content.

Pursuant to an illustration, a first media source can be actively engaged on media system 202 such that media content of the first media source is presented on output devices 206. A user can select a subsequent media source from the set of available sources wherein the preview component 404 provides a preview or sample of the subsequent media source without disrupting the actively engaged source. In an embodiment, the preview or sample is displayed in a preview pane or window in situ with information related to the actively engaged source and the displayed list of available media sources. Accordingly, a user can survey media content from a plurality of media sources in a preview window instead of a list of textual options that describe the media content.

Figure 5:
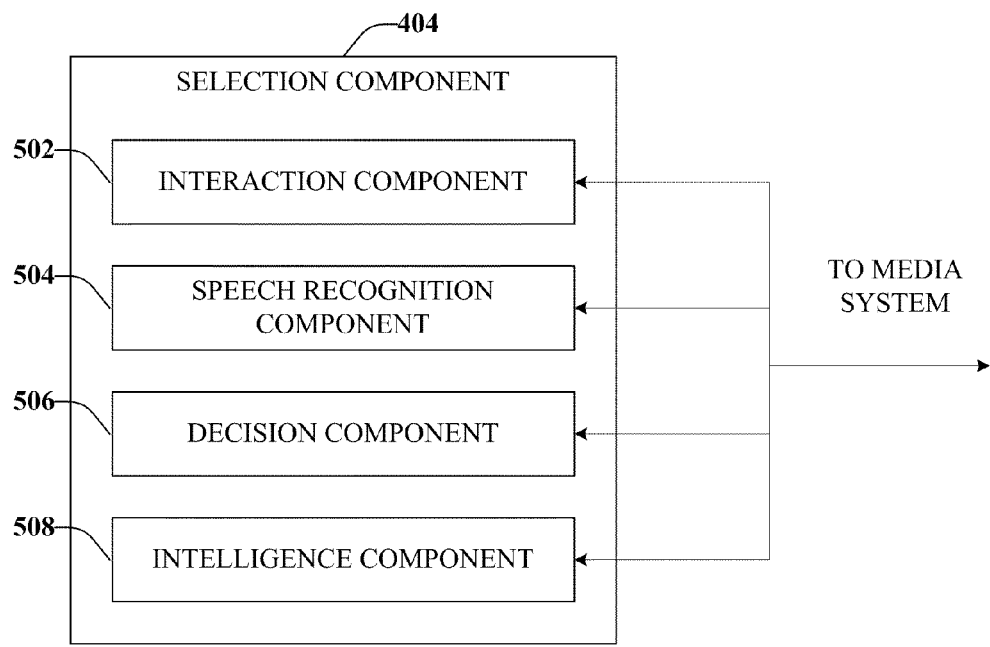
FIG. 5 illustrates a detailed selection component in accordance with an aspect of the subject disclosure.

FIG. 5 illustrates a detailed selection component 404 that communicates with a media system and/or components of the media system. The selection component 404 can include an interaction component 502 that facilitates displaying a set of available media sources and obtaining user input related to a selection of a subset of available media sources. For example, interaction component 502 can provide a user interface that presents the set of available media sources and receives user selections via an input device. The input device can be a touch screen, a button, a knob, a switch or any other mechanism capable of providing an indication of a user choice. In an illustrative instance, a user can touch a portion of a touch display corresponding to a DVD media source selection to indicate a desire to preview the DVD. The interaction component 502 can provide the user selection to the preview component 406 or another component of media system 202.

In addition, the input device can be a microphone configured to obtain voice input from a user. The selection component 404 includes a speech recognition component 504 that collects and processes speech-based selection requests. For example, a user can speak a word, a phrase or a sentence that specifies a selection of a media source for preview. The speech recognition component 504 can obtain the spoken word, phrase or sentence from a microphone or other voice input device. The speech recognition component 504 analyzes voice input to determine an intended media source selection. According to an aspect, the speech recognition component 504 can compare and match the voice input to a stored vocalization corresponding to a particular source selection. For example, a user can store a sample vocalization in association with a DVD media source such that the vocalization selects that media source. In addition, the speech recognition component 504 can analyze the sound (e.g. frequency, amplitude . . . ) to determine a candidate word, phrase or sentence vocalized.

The selection component 404 can also include a decision component 506 that automatically selects one or more media sources for preview. The decision component 506 can provide a media source for preview without requiring explicit input from a user. By way of example and not limitation, the decision component 506 can provide an initial media source selection for preview absent a currently engaged media source. The initial media source selection can be specified in a persisted user preference. In addition, the initial media source selection can be inferred from past user interactions. For example, the decision component 506 can observe a favored media source or a media source frequently engaged by a user. The decision component 506 can also provide a cycling through of available media sources. The cycle order can be random or based upon a supplied and/or inferred user preference. Each preview of each media source can be displayed for a time period. The time period can be of sufficient length to enable a user to survey a media source. In addition, the time period can be established as a configurable user preference.

Various inferences or determinations that occur in relation to the decision component 506 can be processed by an artificial intelligence component 508. For instance, the intelligence component 508 can infer that a user favors a particular media source or a subset of media sources. Moreover, the artificial intelligence component 508 can make different determinations, such as determining an appropriate media source to display.

The intelligence component 508 can employ one of numerous methodologies for learning from data and then drawing inferences and/or making determinations related to applying a service (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

Figure 6:
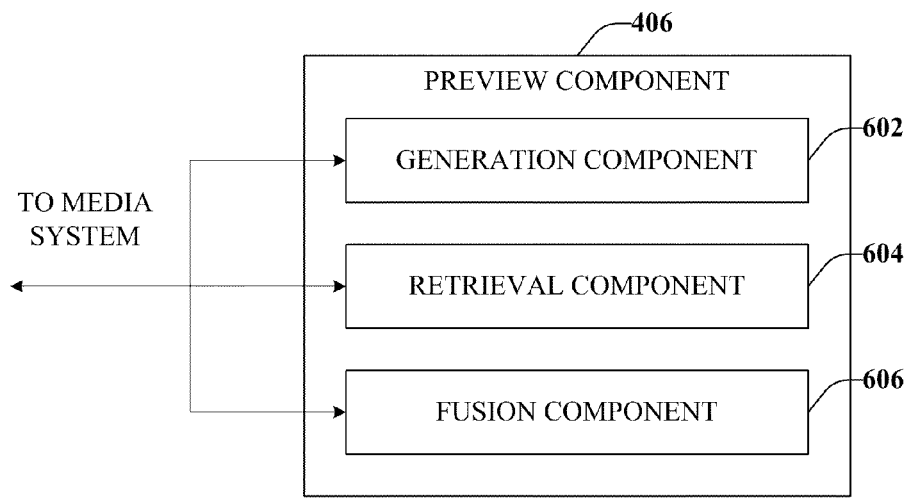
FIG. 6 illustrates a detailed preview component in accordance with an aspect of the subject disclosure.

FIG. 6 depicts a detailed preview component 406 according to an aspect of the subject disclosure. The preview component 406 includes a generation component 602 that produces a sample or preview of a media source or sources selected for preview. In one embodiment, the generation component 602 extracts at least a portion of media content from the media source. For example, the generation component can access a DVD and extract a trailer of the movie. The generation component 602 can also attach to a data stream of media content that is actively engaged on an output device of some other user (e.g., a rear seat passenger utilizing a seat back display).

In accordance with an aspect, the preview component 406 can include a retrieval component 604 that can obtain a sample or preview of a media source from a remote system or storage location. The retrieval component 604 can access a media source to discern identification information related to the media content. The retrieval component 604 can utilize the identification information to query the remote system or storage location for a suitable preview. For example, the retrieval component 604 can access a compact disc in a CD player to collect identification information. The retrieval component 604 can access the internet via a wireless connection to retrieve at least one of an artist name, a CD title, a track list or other such data. The retrieved information can be employed as a preview of the contents of the CD. In another illustrative instance, similar identification information can be obtained from a DVD movie. The information can be employed to gather a trailer of the movie from a video repository or other remote location.

The preview component 406 further includes a fusion component 606 that synthesizes a sample or preview from a combination of two or more sub-samples. The sub-samples can include previews of the source obtained from disparate preview sources or media sources. For example, fusion component 606 can produce a preview synthesized from a sample obtained from a media source and a sample retrieved from a remote location. In addition, the fusion component 606 can generate a preview that includes media content from more than one media sources. In an illustrative instance, the fusion component 606 can produce a preview that includes video content from a DVD and audio content from a CD.

The fusion component 606 can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation, which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed by fusion component 606 may include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Figure 7:
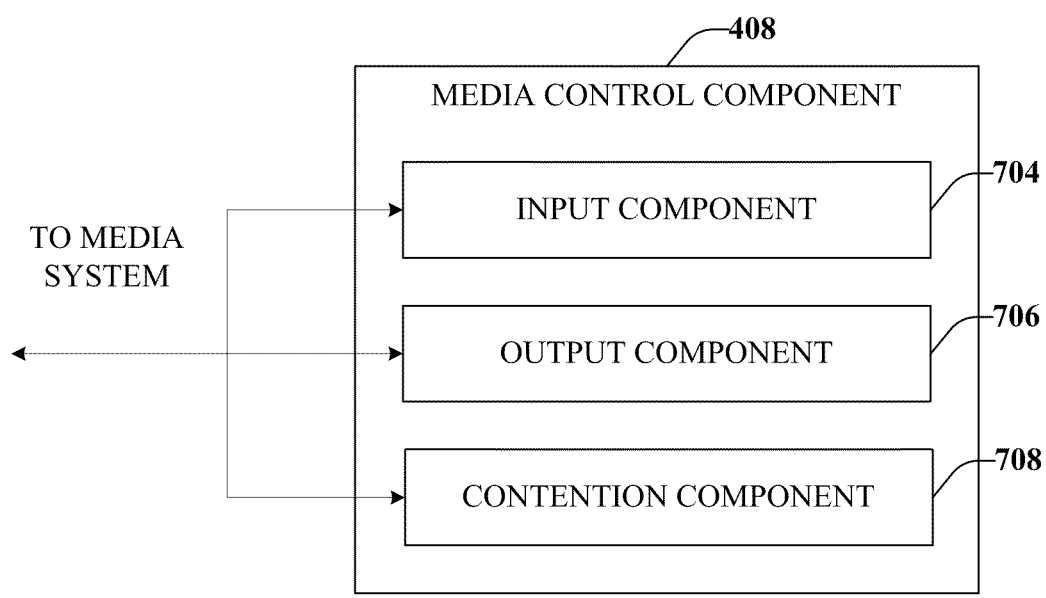
FIG. 7 illustrates a detailed media control component in accordance with an aspect of the subject disclosure.

FIG. 7 illustrates a detailed media control component 408 in accordance with an aspect of the subject disclosure. The media control component 408 that communicates with a media system and/or components of the media system. In particular, the media control component 408 can operate as an interface between media sources and other components of a media system. The media control component 408 can include an input component 702 that provides user input capabilities. The input component 702 can collect, process, format or analyze data from one or more input devices utilized by a user while interacting with a media system. The media control component can also include an output component 704 that provides output information to at least one output device. For example, the output component 704 can provide at least one of a media source list, a picture-in-picture preview pane, or a currently engaged source information pane to an output display.

In addition, the input component 702 and output component 704 can include any suitable and/or necessary interface components, which provide various adapters, connectors, channels, communication paths, etc. to integrate the media control component 408 into virtually any operating, media and/or vehicular system(s) and/or with one another. In addition, the interface components can provide various adapters, connectors, channels, communication paths, etc., that provide for interaction with the media control component 408, input devices, output devices, media sources, and any other device and/or component associated with the media system.

The media control component 406 further includes a contention component 706 that resolves conflicts or clashes between preview media content and actively engaged media content. The contention component 706 can resolve conflicts based at least upon considerations of a currently engaged media source, a selected preview media source, and a context of a user. The contention component 706 can attenuate currently played media content during preview of media source samples. For example, the contention component can dim or reduce the volume of a currently playing audio content during preview of another media source. In addition, the contention component 706 can not attenuate the currently played media during preview of a different source. In an illustrative instance, audio associated with a video source (e.g. audio track of a DVD movie) can be muted during preview of the DVD movie such that only the video portion is previewed. Moreover, the contention component 706 can full attenuate the currently played content. For example, the contention component 706 can determine a switch to presenting audio and video of the previewed media source as discontinue presenting audio and/or video of the currently played content.

Figure 8:
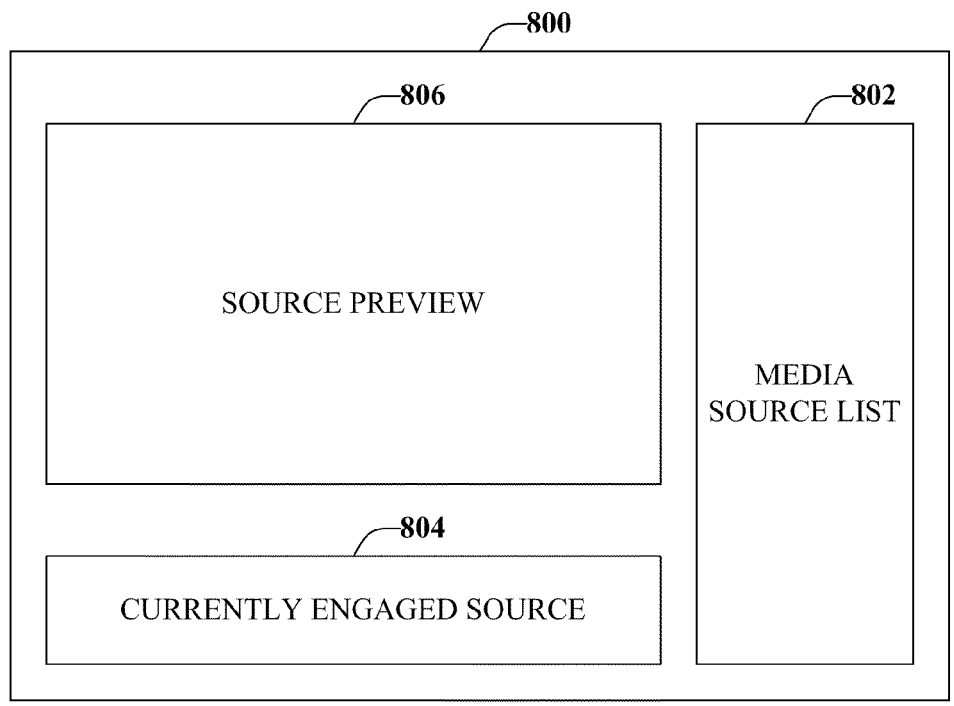
FIG. 8 illustrates an example arrangement for an output display according to an aspect of the subject disclosure.
Figure 9:
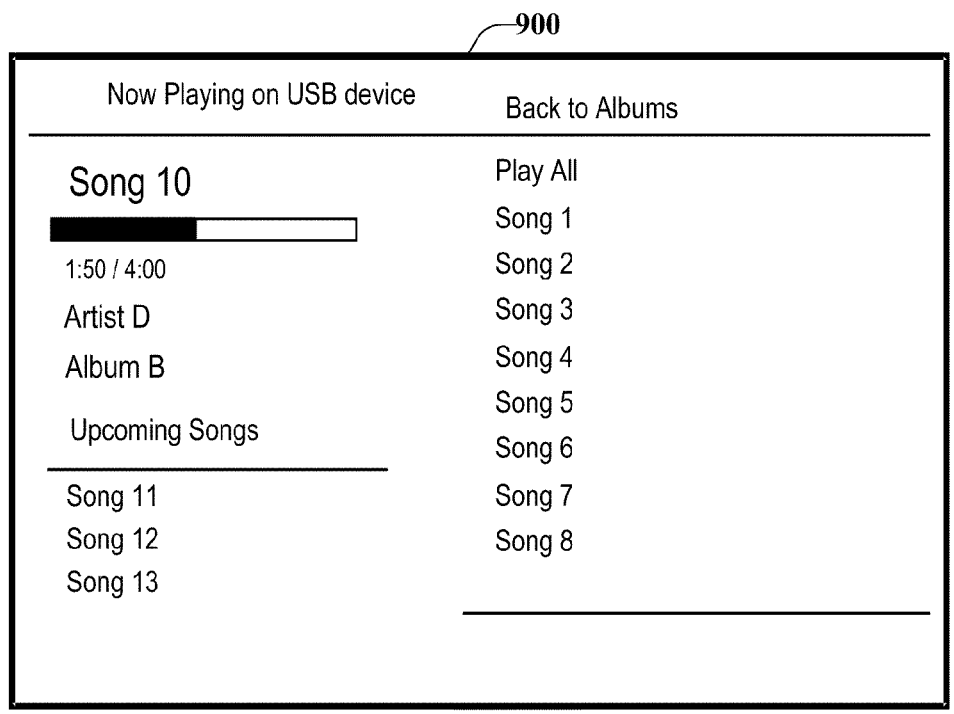
FIG. 9 illustrates an example output screen according to an aspect of the subject disclosure.
Figure 10:
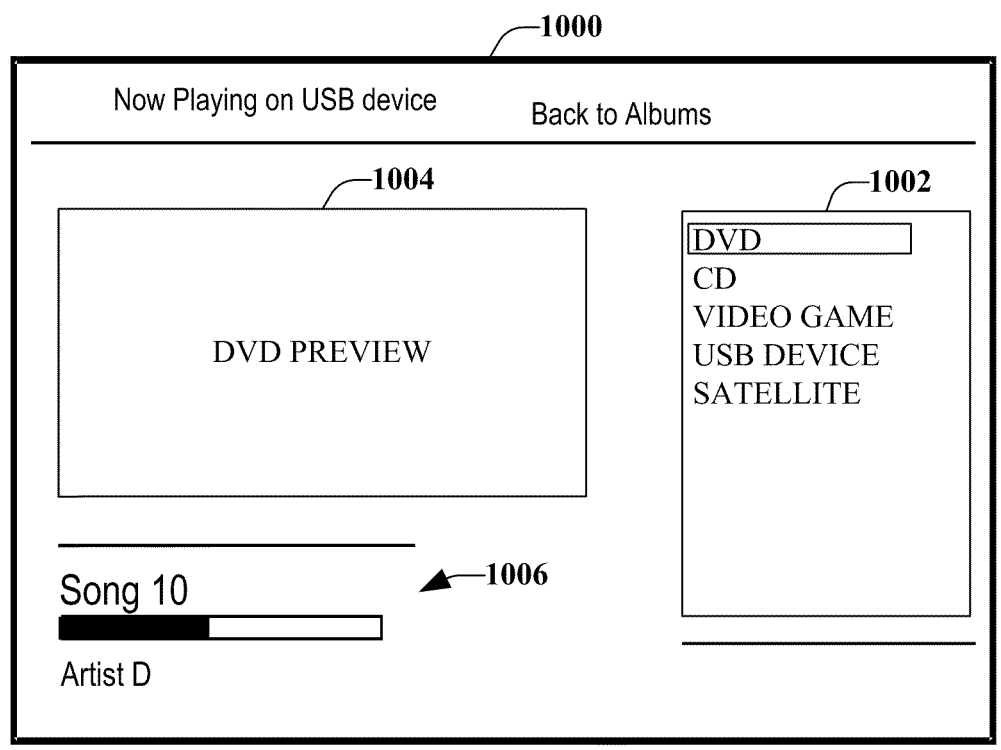
FIG. 10 illustrates an example output screen in accordance with an aspect of the subject disclosure.

What follows are exemplary input and/or output screens provided to facilitate understanding with respect to aspects of subject disclosure. FIGS. 8-10 depict example user interface layouts and screens. FIG. 8 depicts an example arrangement on an output display suitable for previewing media content from a set of available media sources. In an embodiment, a screen 800 includes three windows or panels in which different information can be displayed. The screen 800 includes a media source list 802 that displays a list of available media sources that can be preview and/or actively engaged by a user. The screen 800 further includes a currently engaged source panel 804 that provides information related to an actively engaged media source and/or media content. A source preview window 806 is provided that displays a sample or preview of media content offered by a selected media source or displays additional details relating to the media content.

FIGS. 9 and 10 depict example output screens and illustrate changes in the display when previewing media content. FIG. 9 depicts an example output screen 900 in which a user is currently playing audio media content from a USB device. In a illustrative instance, the screen 900 can display information such as, but not limited to, a name of a song, an artist name, an album name, time into and remaining in the song, a progress bar, a list of upcoming songs and the like. The screen 900 can also indicate the currently active and engaged media source (e.g., USB device).

While media content from the actively engaged media source is playing, a user (e.g. a passenger in a vehicle, airplane, etc.) can elect to preview media content offered from a plurality of available media sources. The user can choose a menu or preview option via a push of a button on the screen, on the surrounding panel, or other mechanism. After electing to preview other media content, the output screen can change. FIG. 10 depicts and example output screen 1000 in which a user is playing audio media content from a USB device while previewing additional content. Screen 1000 includes a media source list 1002 that displays a list of available media sources. In the exemplary illustration provided by FIG. 10, a DVD player media source is selected in the media source list 1002. A selection in the media source list 1002 indicates a desire to preview media content from the selected source. Accordingly, the screen 1000 displays a DVD preview window 1004 that presents video media content associated to the DVD movie. In addition, screen 1000 include an area 1006 that displays information related to the actively engaged media source which continues to be the audio media content from a USB device.

Figure 11:
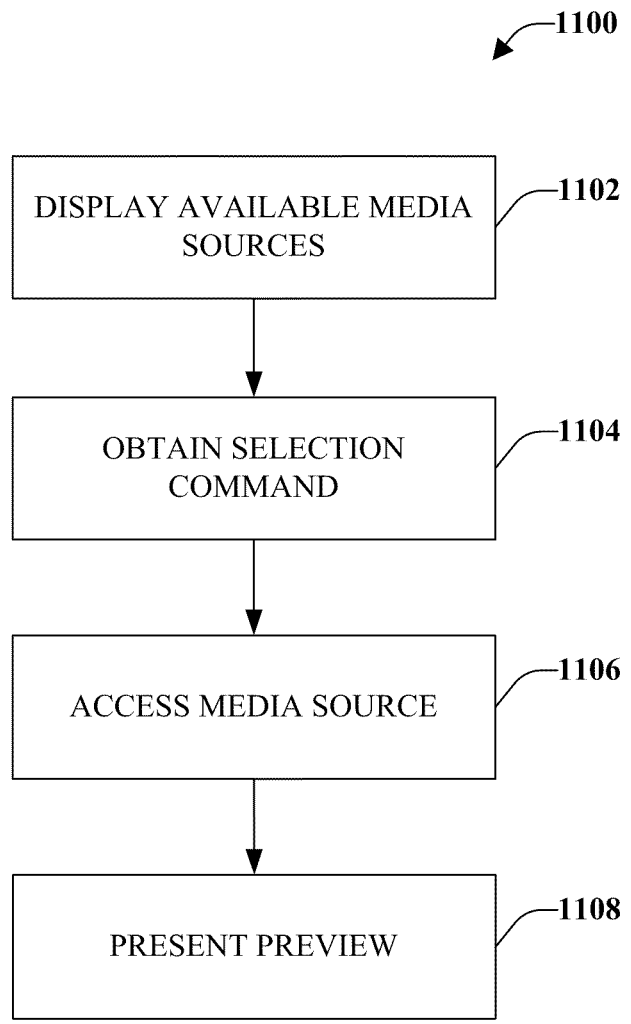
FIG. 11 illustrates an exemplary methodology that facilitates previewing media content form a media source.
Figure 12:
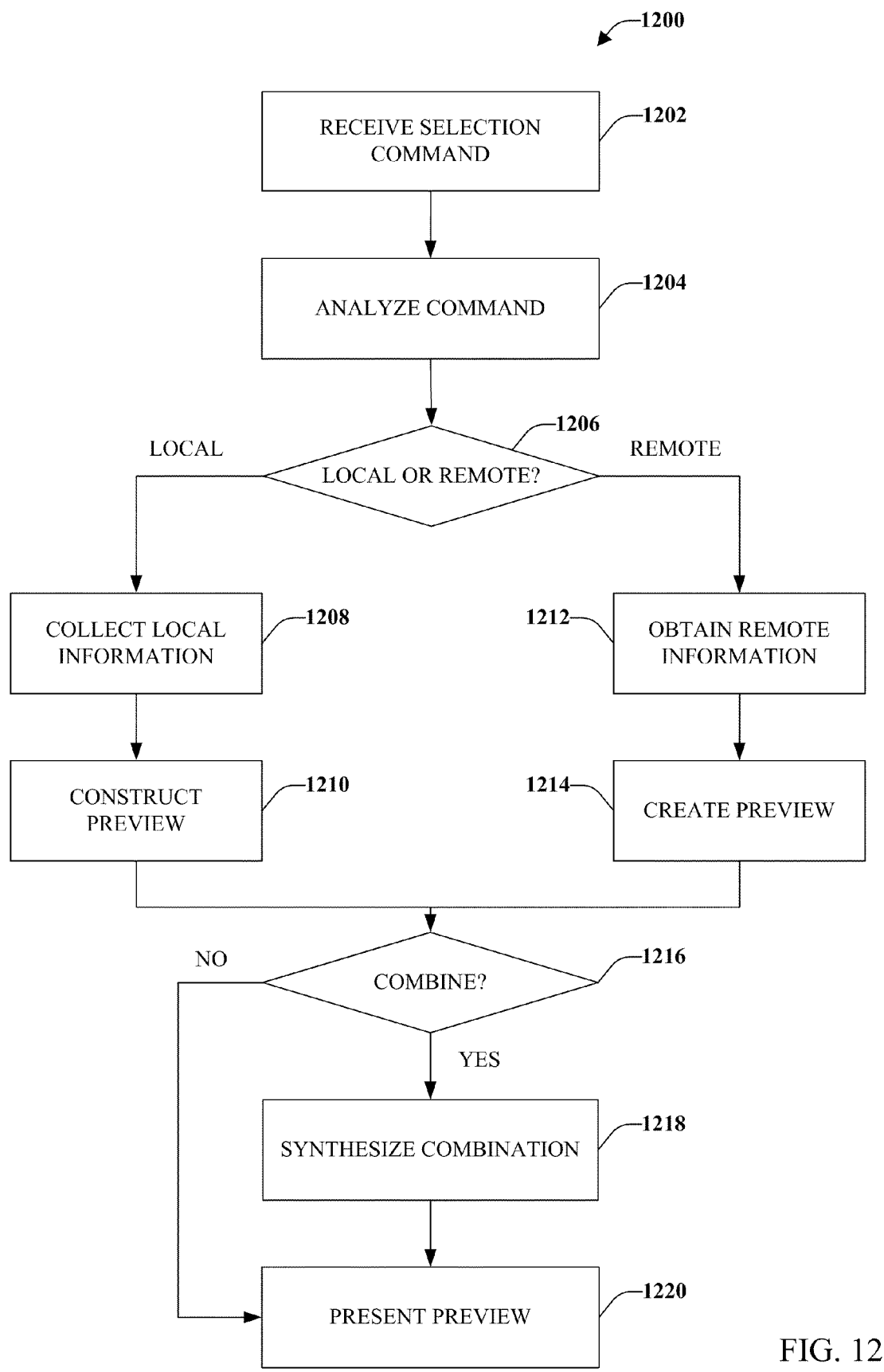
FIG. 12 illustrates an exemplary methodology that facilitates generating previews of media content from a media source.

FIGS. 11-12 illustrate methodologies and/or flow diagrams in accordance with the claimed subject matter. For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

FIG. 11 illustrates a method 1100 that facilitates previewing media content from a media source from among a set of available media sources. The method 1100 can be implemented in a media system such as, for example, an entertainment system include within a vehicle, airplane, building or the like. The method 1100 can be employed, among other things, to provide previews of media content from available media source without disrupting an actively engaged media source. The method 1100 commences at reference numeral 1102 where available media sources are displayed. The list can be produced from a index that maintains a current list of available media sources including removable or portable media sources. The media sources can include one or more audio sources, video sources, video game sources, auxiliary sources, remote source and the like. At reference numeral 1104, a selection command is obtained. The selection command can originate from a user or an artificial intelligence system. The selection command indicates one or more media sources to preview from among the available media sources. At reference numeral 1106, the media source specified from the selection command is accessed. Accessing the media source can include attaching to a stream of media content emanating from the media source. In addition, accessing the media source can involve extracting a portion of media content from the media source. At reference numeral 1108, the preview is presented. In one embodiment, the preview is presented alongside currently playing media content. The preview can include the stream of media content, the extracted portion of media content, or some other information related to the media source.

FIG. 12 illustrates an example method 1200 that facilitates generating previews or samples of media content from a media source from among a set of available media sources. The method 1200 can be implemented in a media system such as, for example, an entertainment system include within a vehicle, airplane, building or the like. The method 1200 can be employed, among other things, to provide previews of media content from available media source without disrupting an actively engaged media source. At reference numeral 1202, a selection command is received. The selection command can originate from a user or an artificial intelligence system. The selection command indicates one or more media sources to preview from among the available media sources. At reference numeral 1204, the selection command is analyzed. The command can be analyzed based upon user preferences that indicate how a preview should be generated, a location where preview content should be retrieved, etc. For example, preview content can be retrieved locally from the media source or remotely from a location remote from the media system.

At reference numeral 1206, a determination is made as to whether local or remote preview content should be utilized. If local content is employed, the method 1200 proceeds to reference numeral 1208 where local content information is collected. The local content information can be extracted from the media source. In addition, the local content information can be media content can be a stream of data intercepted from the media source. At 1210, a preview is constructed. The preview can be comprised of the extracted information, the streamed information or portions thereof. If a determination is made at 1206 that remote content should be employed, the method 1200 proceeds to reference numeral 1212 where remote information is obtained. The remote information can be obtained from the Internet, a remote database, or other remote system. The remote information can be, for example, media content related to content offered by the media source selected for preview. At reference numeral 1214, a suitable sample or preview is created based at least upon the obtained remote information.

At reference numeral 1216, a determination is made as to whether the remote information and the local information should be combined. If no, the method 1200 proceeds to reference numeral 1220 where a preview is presented based only one of local information or remote information but not both. If a combination is desired at 1216, the method 1200 proceeds to reference numeral 1218 wherein a combination is synthesized. By way of example, audio content can be locally extracted from a CD in a CD player media source. In addition, remote information relating the artist name, album name, track list, etc. can be retrieved from a remote system. The local and remote information can be combined such that an audio sample can be presented in conjunction with detailed metadata related to the CD.

While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A media content system, comprising:
a processor, coupled to a memory, that facilitates execution of computer-executable components, comprising:
an index component that provides an index of a set of available media source devices;
a selection component that displays the set of available media source devices, and receives a subset of selection requests that facilitate selection of a subset of the media source devices of the set of available media source devices;
a preview component that presents a subset of samples of media content associated with the subset of media source devices concurrently with presentation of media content received from an engaged media source device prior to active engagement of the subset of media source devices, wherein the preview component comprises a fusion component that obtains a first sub-sample of media content from a first media source device of the subset of media source devices and a second sub-sample of media content from a second media source device of the subset of media source devices, and synthesizes the first sub-sample of media content and the second sub-sample of media content to combine the first sub-sample of media content and the second sub-sample of media content together to generate a sample of media content, and wherein the first sub-sample of media content is a first preview portion of the sample of media content and comprises video content, and the second sub-sample of media content is a second preview portion of the sample of media content; and
a contention component that, during a preview of the sample of media content of the subset of samples of media content, attenuates a preview audio portion of the sample of media content received from a media source device of the subset of media source devices and concurrently presents a preview video portion of the sample of media content received from the media source device and a video portion and an audio portion of the media content received from the engaged media source device, to facilitate resolution of a conflict between the media content and the sample of media content.

2. The system of claim 1, wherein the computer-executable components further comprise a media control component that facilitates at least one of accessing, extracting, or presenting respective media content associated with respective media source devices of the set of available media source devices.

3. The system of claim 2, wherein the media control component comprises an output component that provides at least one of a media source device list, a picture-in-picture preview pane, or an information pane associated with the engaged media source device.

4. The system of claim 2, wherein the media control component comprises an input component that obtains and processes user input information received via a user interface.

5. The system of claim 1, wherein the contention component determines the resolution of the conflict between the media content received from the engaged media source device and the sample of media content of the subset of samples of media content.

6. The system of claim 5, wherein the audio portion of the media content received from the engaged media source device comprises audio content, the video portion of the media content comprises video content, the preview audio portion of the sample of media content comprises preview audio content, and the preview video portion of the sample of media content comprises preview video content.

7. The system of claim 6, wherein the contention component determines that attenuation of the preview audio content of the sample of media content received from the media source device during the preview of the sample of media content will resolve the conflict between the sample of media content and the media content received from the engaged media source device, and attenuates the preview audio content of the sample of media content during the preview of the sample of media content in response to the determination that the attenuation of the preview audio content of the media content will resolve the conflict between the sample of media content and the media content.

8. The system of claim 1, wherein the contention component switches from the media content received from the engaged media source device to facilitate the presentation of the sample of media content associated with the media source device of the subset of media source devices.

9. The system of claim 1, wherein the selection component comprises a speech recognition component that receives and processes speech-based selection requests to facilitate the selection of the subset of media source devices.

10. The system of claim 1, wherein the selection component comprises a decision component that selects the media source device of the set of available media source devices to facilitate the preview of the sample of media content associated with the media source device.

11. The system of claim 10, wherein the decision component cycles through the set of available media source devices at a defined rate.

12. The system of claim 10, wherein the decision component selects the media source device based at least in part on user preference data.

13. The system of claim 10, wherein the selection component further comprises an artificial intelligence (AI) component that generates at least one inference or at least one determination in connection with the selection of the media source device, and wherein the AI component performs a probabilistic or statistical-based analysis using user preference data in connection with the generation of the at least one inference regarding the selection of the media source device.

14. The system of claim 1, wherein the preview component comprises a retrieval component that obtains the sample of media content of the subset of samples of media content from a remote system that comprises the media source device.

15. The system of claim 1, wherein the preview component presents the preview of the sample of media content comprising a synthesized combination of the first sub-sample of media content and the second sub-sample of media content in a preview pane.

16. The system of claim 1, wherein the set of available media source devices comprise one or more video source devices, audio source devices, video game source devices, auxiliary source devices, or remote source devices.

17. The system of claim 1, wherein the index component detects an addition of another media source device to the media content system and modifies the index of the set of available media source devices to include the other media source device.

18. The system of claim 1, wherein the system is implemented in a vehicle that is at least one of an automobile, an airplane, a rail system vehicle, or a watercraft.

19. A method, comprising:
displaying, by a system comprising a processor, a set of available media source devices;
receiving, by the system, a selection request for selecting a first media source device and a second media source device of the available media source devices;
accessing, by the system, the first media source device and the second media source device to facilitate previewing a sample of media content associated with the first media source device and the second media source device;
synthesizing, by the system, a first sub-sample of media content received from the first media source device and a second sub-sample of media content received from the second media source device to produce the sample of media content comprising the first sub-sample of media content integrated with the second sub-sample of media content, wherein the first sub-sample of media content is a first preview portion of the sample of media content and the second sub-sample of media content is a second preview portion of the sample of media content; and
to facilitate resolving a conflict between media content received from an engaged media source device and the sample of media content associated with the media source device, during the previewing of the sample of media content associated with the media source device,
attenuating, by the system, a first audio portion of the sample of media content received from the media source device, and
presenting, by the system, a first video portion of the sample of media content associated with the media source device concurrently with presenting a second audio portion and a second video portion of the media content received from the engaged media source device, prior to engaging the media source device, to facilitate determining whether to fully engage the media source device.

20. The method of claim 19, further comprising generating, by the system, the sample of media content.

21. The method of claim 20, further comprising analyzing, by the system, the selection request to facilitate determining whether at least one of a local store or a remote store is to be employed to facilitate generating the sample of media content.

22. The method of claim 21, further comprising:
receiving, by the system, identification information from the media source device; and
retrieving, by the system, a portion of the sample of media content from a remote store in response to determining that at least the remote store is to be employed to facilitate generating the sample of media content.

23. The method of claim 19, wherein the presenting the sample of media content comprises initiating playback of the sample of media content in a preview pane.

24. A system that facilitates inspection of media source devices in a vehicle entertainment environment, comprising:
means for indexing and displaying a plurality of media source devices;
means for receiving a selection of a first media source device and a second media source device of the plurality of media source devices;
means for generating a preview of media content associated with the first media source device and the second media source device, prior to engaging the first media source device and the second media source device, in response to receiving the selection of the first media source device and the second media source device, wherein the means for generating the preview of media content comprises means for synthesizing a first preview portion of media content received from the first media source device and a second preview portion of media content received from the second media source device to combine the first preview portion of media content and the second preview portion of media content to generate the preview of media content;
means for attenuating a first audio portion of the preview of media content presented by the first media source device and the second media source device during simultaneous presentation of a first video portion of the preview of media content and presentation of a second audio portion and a second video portion of the media content received from the engaged media source device, to facilitate resolution of a conflict between the media content received from the engaged media source device and the preview of media content; and
means for presenting the first video portion of the preview media content in a picture-in-picture window simultaneously with presenting the second audio portion and the second video portion of the media content received from the engaged media source device.

25. The system of claim 24, further comprising:
means for determining the resolution of the conflict between the media content received from the engaged media source device and the preview of media content.

* * * * *